(12) United States Patent
Fisher et al.

(10) Patent No.: US 7,412,371 B2
(45) Date of Patent: Aug. 12, 2008

(54) TIME SYNCHRONIZED PLAYBACK AND CONTROL OF DISSIMILAR DATA FILES

(75) Inventors: David Leonard Fisher, Winter Springs, FL (US); James Luis Bryan, Geneva, FL (US)

(73) Assignee: Northrop Grumman Corporation, Los Angeles, CA (US)

( * ) Notice: Subject to any disclaimer, the term of this patent is extended or adjusted under 35 U.S.C. 154(b) by 635 days.

(21) Appl. No.: 10/862,412

(22) Filed: Jun. 8, 2004

(65) Prior Publication Data

US 2006/0004862 A1    Jan. 5, 2006

(51) Int. Cl.
G06F 17/50    (2006.01)
G06F 1/14    (2006.01)

(52) U.S. Cl. .............................. 703/17; 703/22; 703/27; 715/751; 709/205

(58) Field of Classification Search .................. 703/22, 703/27, 17; 715/751; 380/201, 205; 709/205
See application file for complete search history.

(56) References Cited

U.S. PATENT DOCUMENTS 7,007,235 B1 *  2/2006  Hussein et al. ............... 715/751
2005/0108289 A1 *  5/2005  East et al. ................... 707/200
2007/0053513 A1 *  3/2007  Hoffberg ..................... 380/201

* cited by examiner

Primary Examiner—Thai Phan
(74) Attorney, Agent, or Firm—Andrews Kurth LLP

(57) ABSTRACT

A system, and a corresponding method, provides time synchronized playback and control of dissimilar data in a simulation architecture. The system includes a master site including a controller, and agents, implemented by the controller, where the controller directs the agents to control simulation data logging and playback; simulation sites, including: one or more simulation computers, where simulation events occur, a computer, where the agents control the simulation site to record the simulation data, and a local log that stores the simulation data as events, where the agents control the test computer to replay the events; a time reference system including a master site time stamp, local time stamp pair for each of the simulation sites, each of the local time stamps related to a master time stamp, and one or more time normalization factors. The time normalization factors relate times recorded for each of the events to an earliest recorded event and to a time of initiation of a replay command. In the system, a corrected event time, dtEvent, and a corrected system time, dtSystem, are established. Events are then injected for replay into the simulation architecture when the dtEvent and the dtSystem are equal.

19 Claims, 9 Drawing Sheets

TIME SYNCHRONIZED PLAYBACK AND CONTROL OF DISSIMILAR DATA FILES

TECHNICAL FIELD

The technical field relates to simulators that are used to provide a training architecture. More specifically, the technical field relates to synchronized playback to a simulated training event.

BACKGROUND

Simulation is a process whereby the functionality of a system is modeled in software, which is run on a simulator host computer. Typically, the model is based on design data provided to the simulator designer by the system manufacturer. For a full fidelity trainer, the model must implement all functionality of the system and run in real time. All signal and data interfaces of the device must also be simulated. Use of the simulation approach provides significant benefits. The model can include simulator specific functions that are not present in the actual (modeled) system. For example, a "freeze" mode of operation that pauses or maintains a frame of the simulator operation can be readily accommodated during a simulation, whereas such a "freeze" mode is impossible to attain in normal operation of the actual system. Additionally, when using the simulation approach, actual systems, which are often costly and require special interfacing hardware, are not needed. Further, portions of the actual system that normally operate undetected by the personnel being trained, such as diagnostic testing and the like, can be simplified or not modeled when using a simulator.

Another advantage of simulation is the ability to review a completed training exercise by playback of recorded data. During this review, synchronized playback and control of data files is desirable in order to properly relate events that occurred during the training exercise. An example of a training exercise may be a simulation of a coordinated attack of ground support aircraft protected by a fighter cover and guided by an airborne warning and command system (AWACS) aircraft. Such a simulation may occur over geographically dispersed areas. For example, simulators at an Air Force base in Missouri might be used for the attack and fighter aircraft, while simulators at an Air Force base in New York are used for the AWACS aircraft. The simulators at both locations may record simulation data, which are then played back after the simulation so that the simulation participants can review the consequences of their actions. However, because the simulation sites are dispersed in this example, play back of the data files may present a synchronization problem. In addition to the dispersed nature of simulation sites, the data present at the simulation sites, and even the data representation protocols may be different at the different simulation sites. This precludes the possibility of replay of a single file over the network and necessitates the logging and replay of dissimilar data files.

SUMMARY

What is disclosed is a method for time synchronizing playback of dissimilar data files. The method includes logging first data at a first site, logging second data at a second site, logging the nth data at the nth site, where the first data, the second data and the nth data relate to a simulation; establishing master time stamps at a master site, the master time stamps related to a computer system clock at the master site, where the master site and the first, second, and nth sites comprise a simulation architecture, establishing local time stamps at each of the first, second, and nth sites, the local time stamps related to local times at the first, second, and nth sites; recording the master and the local time stamps such that each pair of master and local site time stamps are made at the same instance, commencing a replay of the simulation; normalizing times recorded of each event in the simulation, where the normalization creates time differentials dtSystem and dtEvent, advancing dtSystem, and injecting selected ones of the events into the simulation architecture for display, where the selected events are injected when dtEvent equals dtSystem.

Also disclosed is a system that provides time synchronized playback and control of dissimilar data in a simulation architecture. The system includes a master site including a controller, and agents, implemented by the controller, where the controller directs the agents to control simulation data logging and playback; simulation sites, including: one or more simulation computers, where simulation events occur, a computer, where the agents control the simulation site to record the simulation data, and a local log that stores the simulation data as events, where the agents control the computer to replay the events; a time reference system including a master site time stamp and local time stamp pair for each of the simulation sites, each of the local time stamps related to the master time stamps, and one or more time normalization factors, wherein the time normalization factors relate times recorded for each of the events to an earliest recorded event and to a time of initiation of a replay command, wherein a corrected event time, dtEvent, and a corrected system time, dtSystem, are established, and wherein events are injected for replay into the simulation architecture when the dtEvent and the dtSystem are equal.

Also disclosed is method, executed in a system comprising a plurality of nodes, for synchronizing time-referenced data, the time-referenced data recorded at two or more of the nodes. The method includes the steps of establishing a master node and one or more local nodes from the plurality of nodes, establishing master time stamps at the master node, providing a master time stamp to each of the local nodes, establishing a local time stamp at each of the local nodes, wherein the local time stamps are related to the master time stamps, commencing data recording at one or more of the local nodes, recording times data is recorded, whereby the time-referenced data are established, and normalizing the recorded times among the local sites and the master site.

DESCRIPTION OF THE DRAWINGS

The detailed description will refer to the following drawings in which like numbers refer to like items, and in which.

DETAILED DESCRIPTION

Figure 1:
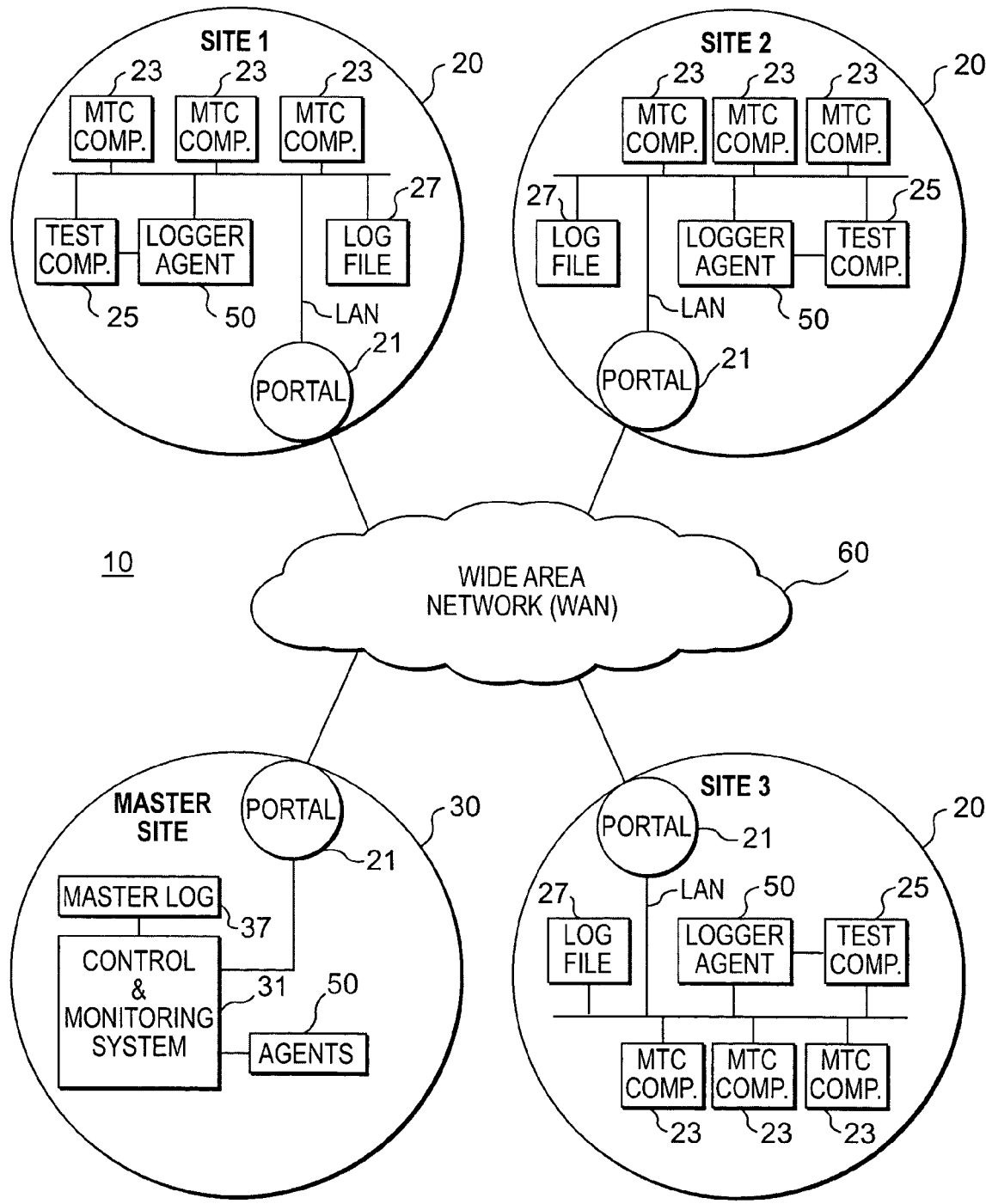
FIG. 1 illustrates a general simulation architecture in which synchronized playback of recorded data is available.

Distributed simulations over a wide area network (WAN) are inherently difficult to control. The distance separating simulation sites exacerbates the problem. The fact that a remote site cannot be accessed directly by the simulation team adds an additional layer of complexity. Moreover, replay of the simulation data is complicated by the fact that the simulation sites are geographically separated, including in different time zones, and may record simulation data using different time references, different data protocols and may join the simulation at different times.

As discussed herein, a solution to the problem of distributed simulation testing is to use remote agent technology in conjunction with a central controller and display module for viewing the simulation results. Agents are semi-autonomous, collaborative, software entities. Agents are designed to allow software systems to delegate tasks and undertake roles in an intelligent manner. In a distributed simulation architecture, agents are software entities that reside on remote simulation systems and that have the ability to determine and execute needed actions, seek and incorporate relevant information and transmit this information for human display or analysis. The agents serve as proxies for the individuals who would otherwise need to be at the remote sites participating in the simulation process.

Distributed simulation provides realistic mission training to combat forces using advanced mission trainers networked across a LAN or WAN. At each simulation site, at least one computer acts as a test computer. The agent's test computer shares the same network segment as simulation computers at the simulation site and has the responsibility for executing the agent software and storing any log data generated by the agents. A lead site may allocate a computer to run the distributed simulation control software that directs the simulation and that controls replay of the simulation data.

As used in the discussion that follows, a simulation refers to a simulated exercise in which simulation data are recorded using test computers, or simply, loggers, at one or more simulation sites. The simulation data may be recorded as discrete data packets, referred to herein as events. Because multiple sites may record events for a single simulation, some mechanism must exist to ensure compatibility of the data packets among the sites. One such mechanism is use of a common data protocol such as protocol data unit (PDU) or High Level Architecture (HLA) protocols, for example. All references herein to events could also be to HLA data packets with the appropriate information in the storage header. Alternatively, or in addition, some mechanism may be provided to translate among various protocols. Associated with each event is a true (absolute) time and a relative (local) time. The true time and the relative time may be recorded along with the simulation data for each event. Because events recorded at distributed simulation sites may use different time references, or because the system clock of the loggers may not be synchronized, a mechanism is described to normalize local times for each of the training centers. Normalizing the local time is one aspect of synchronizing playback of dissimilar data files (i.e., the events).

FIG. 1 illustrates a distributed simulation architecture 10 in which realistic mission training is provided to a number of remotely-located mission training center (MTC) sites 20. The sites 20 are connected to each other and to a master site 30 by a wide area network (WAN) 60. The master site 30 controls various aspects of data logging and playback of simulation events executed on the architecture 10. Each of the sites 20, and the master site 30, include a portal 21. In essence, the portal 21 separates local area network (LAN) sides of the sites 20, 30 from the WAN 60. The portal 21 controls access to the sites 20, 30, and may be a router, a switch, or any protocol transformation device such as a DIS to or from an HLA gateway. The portal 21 also translates among various data packet protocols to ensure that data packets received at a MTC site can be replayed on that MTC site's replay equipment.

The master site 30 includes agents 50 and control and monitoring system (controller) 31. The agents 50 perform remote testing, monitor simulation traffic, and mimic the function of a MTC. The controller 31 loads the agents 50 on appropriate test computers, initializes the agents 50 with specific data, collects test data, and displays the results. The controller 31 uses file transfer protocol (FTP) or similar protocols to transfer agents 50 to the test computers.

Each of the sites 20 includes one or more test computers 25, mission test computers (MTCs) 23, log file 27, and the agents 50. The test computers 25 are used to log simulation data, test latency at the portals 21 and through the architecture 10, and to operate the agents 50.

The MTCs 23 are used at the sites 20 to run specific portions of a simulated test exercise (simulation). For example, one MTC 23 at site 1 (20) may be used to provide the simulation for an F-16C fighter cover operation. Another MTC 23 at site 1 may be used to provide the simulation for KC-135 tanker aircraft flying in support of the F-16C fighter cover. The MTCs 23 may be general or special purpose computers, and may be incorporated into, for example, a virtual cockpit for an aircraft.

The log file 27 is used to record time-stamped data related to the simulation. Such time-stamped data may include track data for a specific F-16C fighter, for example. Each of the sites 20 records the time-stamped data locally in the log file 27, but may also provide some or all of the time-stamped data to other sites 20 and to the controller 31. However, real-time or near real-time transfer of the time-stamped data among the sites 20, 30 may require a large amount of bandwidth, such that local recording of the data is preferred.

Each of the sites 20 is shown with agents 50. The controller 31 transfers the agents 50 to the sites 20 at the start of each simulation. When the agents 50 have been transferred to the site 20, the controller 31 starts the agent's execution. Once running, the agent 50 first "looks" on the MTC computer 23 for local system and network information, then contacts the controller 31 on a listening port (not shown). The controller 31 responds with a unique communication port that is used for all subsequent network communication. At this point the agent 50 starts performing its programmed test procedure or monitoring function. The functions of the agent 50 can be completely autonomous, for example: monitoring simulation traffic, logging results either locally or over the WAN 60, and making decisions based upon the detected simulation behavior. The agents 50 also perform specific tests, correlate data, communicate with other agents 50, and report the results back to the controller 31 or a human operator. Finally, the agents 50 control, at the direction of the controller 31, the replay of simulation, data at the MTC sites 20. Alternatively, the agent 50 may be set up simply as a proxy under the direct control of the controller 31.

In the architecture 10 shown in FIG. 1, the agents 50 can either be set up to listen to "live" simulation data, or a logger file. In the case of "listening" to a log file, one or more agents 50 can be set up as log file player agents, while other agents 50 fill the role of analyzers or other roles. The benefit to using log files is that setting up an expected results file for each of the analysis agents 50 is a straightforward process. Thus the actual data received at the site 20, 30 can be compared with the data in the expected results file and discrepancies uncovered.

In an embodiment, software that implements the controller 31 is written in JAVA™, with component sections, controls, agent selection, system initialization and the display of data. Other sections are provided for automated management, agent registration, and assignment of agents 50 to ports through TCP sockets.

The controller software provides automated registration and initialization processes for the agents 50. An agent 50 registers on a listening port of the controller 31. The agent 50 is first validated to determine if the agent 50 is the correct agent. Once validated and registered, the agent 50 is assigned its own TCP communications port to communicate with the controller 31. Upon establishment of communication on the new port, the controller 31 sends initialization information to the agent 50. The initialization information is derived from initialization files at the controller 31. Once initialized, the agent 50 waits for commands to be issued from the controller 31. The agent 50 responds to data logging commands and to data playback commands. The commands may be provided using synchronization or control messages.

Figure 2:
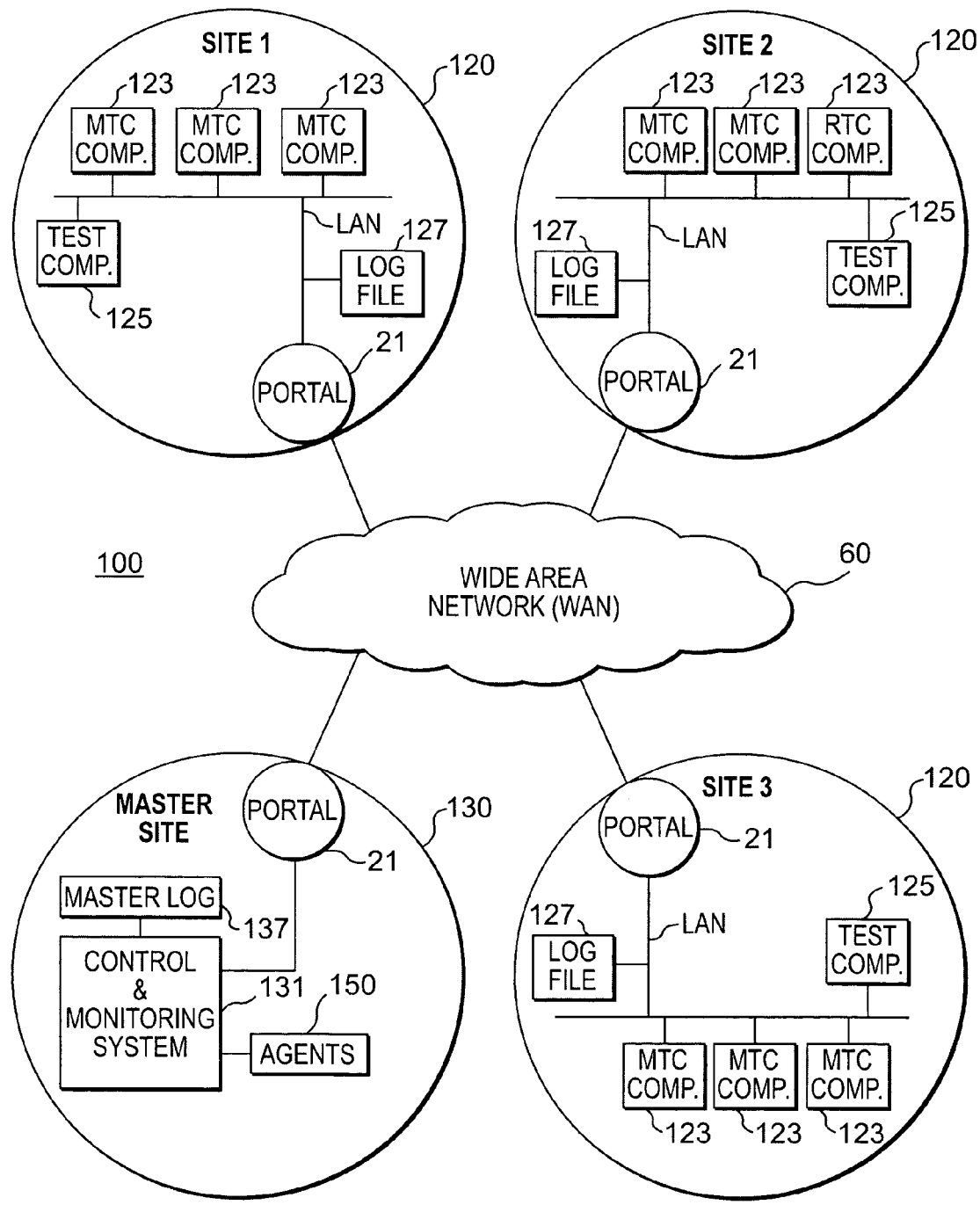
FIG. 2 illustrates another embodiment of a simulation architecture in which synchronized playback of recorded data is available.

FIG. 2 illustrates another embodiment of a system architecture that provides synchronized log file playback. In FIG. 2, architecture 100 includes multiple simulation sites 120 coupled to a master site 130 using the WAN 60. The master site 130 includes a control and monitoring system (controller) 131, agents 150, and a single master log 137 that is used to store all data generated during a simulation. The individual sites 120 may log simulation data locally, but do not provide for long-term storage of data generated during the simulation. Instead, this simulation data are passed to the controller 131 from the individual sites 120. At playback, the appropriate file in the master log 137 is replayed and is broadcast to all sites 120. Synchronization is guaranteed since all sites 120 receive the same simulation data feed.

Figure 3:
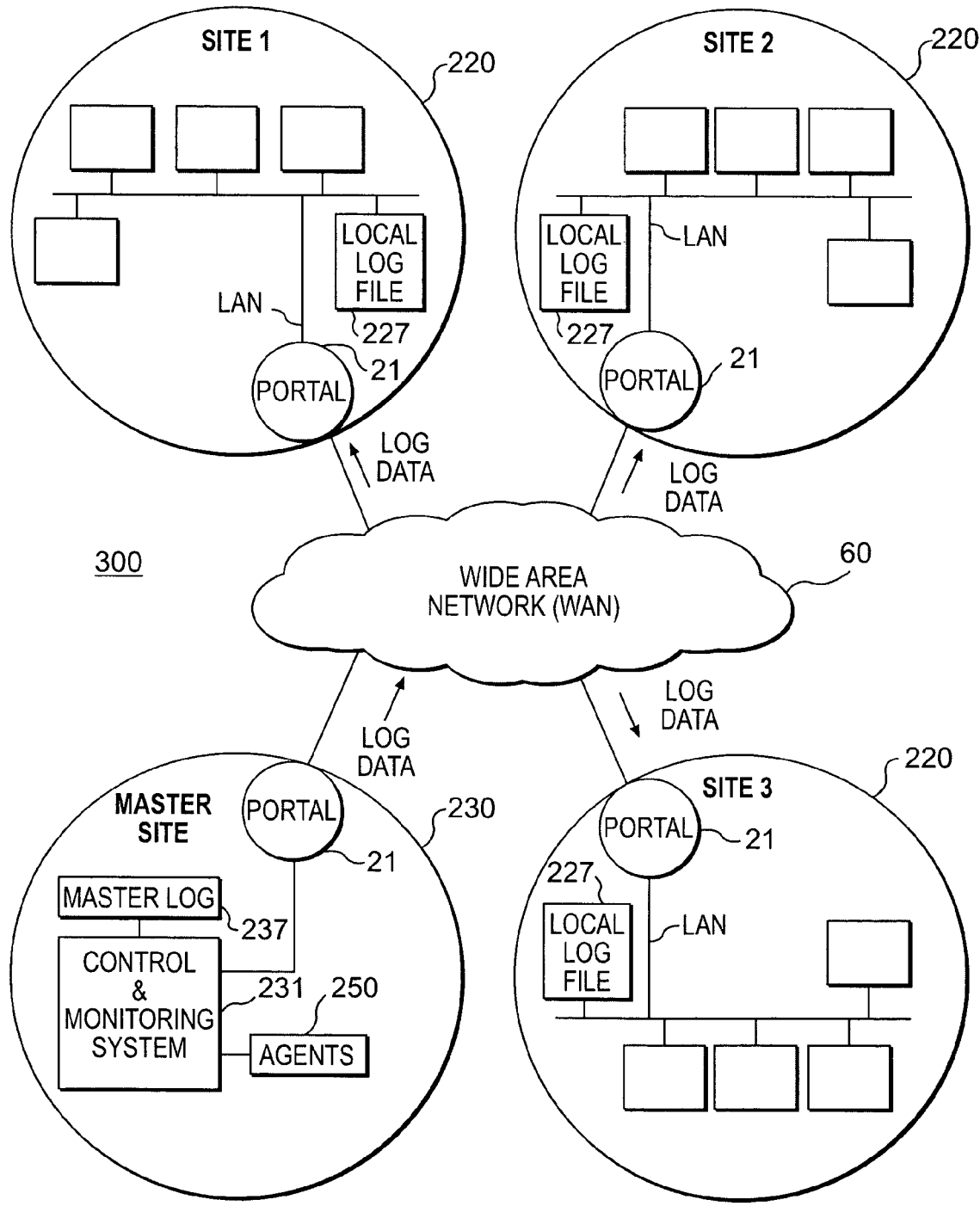
FIG. 3 illustrates yet another embodiment of a simulation architecture in which synchronized playback of recorded data is available.

FIG. 3 illustrates another embodiment of a simulation architecture that provides synchronized playback of similar data files. In FIG. 3, a system architecture 200 includes master site 230 coupled to individual sites 220 using the WAN 60. Each of the sites 220 includes an identical local log file 227. The master site 230 includes a control and monitoring system (controller) 231 and a master log 237. The master log 237 is repeated at each of the sites 220 as the local log file 227. The local log file 227 can be created by copying the master log 237 to each of the sites 220. Such copying may be by way of data transmission over the WAN 60, by sending the data to the sites 220 in a computer readable medium such as a compact disk, and by any other means of data transfer. Synchronization and control of playback is provided through control messages sent from the controller 231 to the sites 220. The architecture 200 solves the problem of data transmission bandwidth for playback of simulation data. However, although playback bandwidth is minimized, the master log 237 must still be created at a single site (e.g., the master site 230) and must then be sent to each of the individual sites 220. The process of sending the master log 237 to the individual sites 220 may be bandwidth intensive, problems if the sites use different protocols and may pose security problems.

Figure 4:
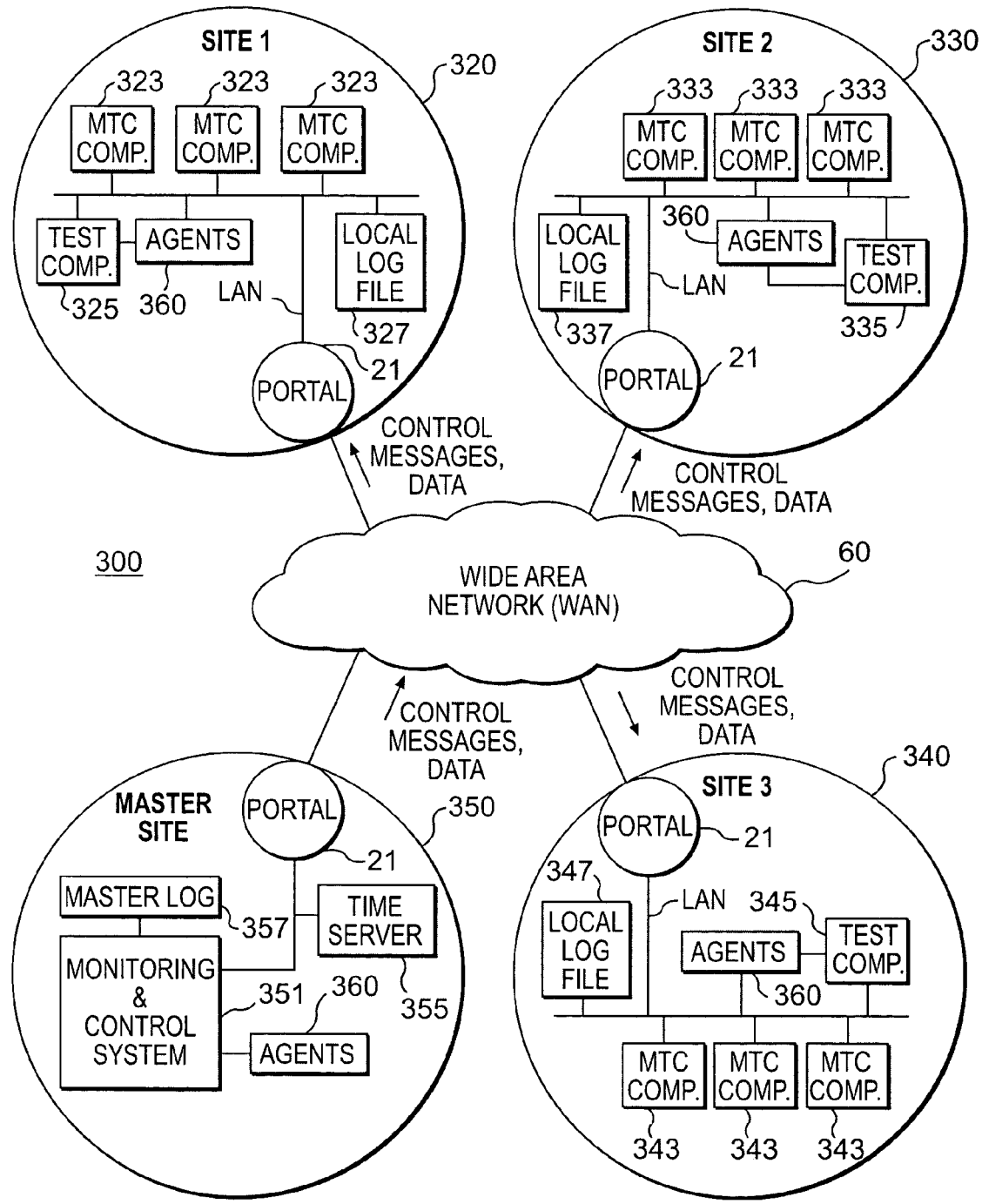
FIG. 4 illustrates still another embodiment of a simulation architecture in which synchronized playback of recorded data is available.

FIG. 4 illustrates yet another architecture that provides synchronized playback of simulation data. Using architecture 300, each of individual sites 320, 330, 340 records data from a simulation in its own local log file 327, 337, 347, respectively. Each local log file 327, 337, 347 is unique, and contains only data entries for events occurring at the individual sites 320, 330, 340. The local log files 327, 337, 347 are played back on the LAN side of each site 320, 330, 340, respectively, and are synchronized from master site 350 using control messages, for example. As will be described later, the synchronization messages contain an initial reference time stamp. The time stamp may be generated by a time server 355 (see FIG. 5) located, for example, at the master site 350. The time stamp is appended to the start of the local log files 327, 337, 347 and a time differential (delta t) is calculated for the transmission of each synchronization message. Alternatively, the time stamp may be stored in another file or data base (not shown). In addition, the time stamp, or similar process, may be provided by an external reference (not shown)).

Figure 5:
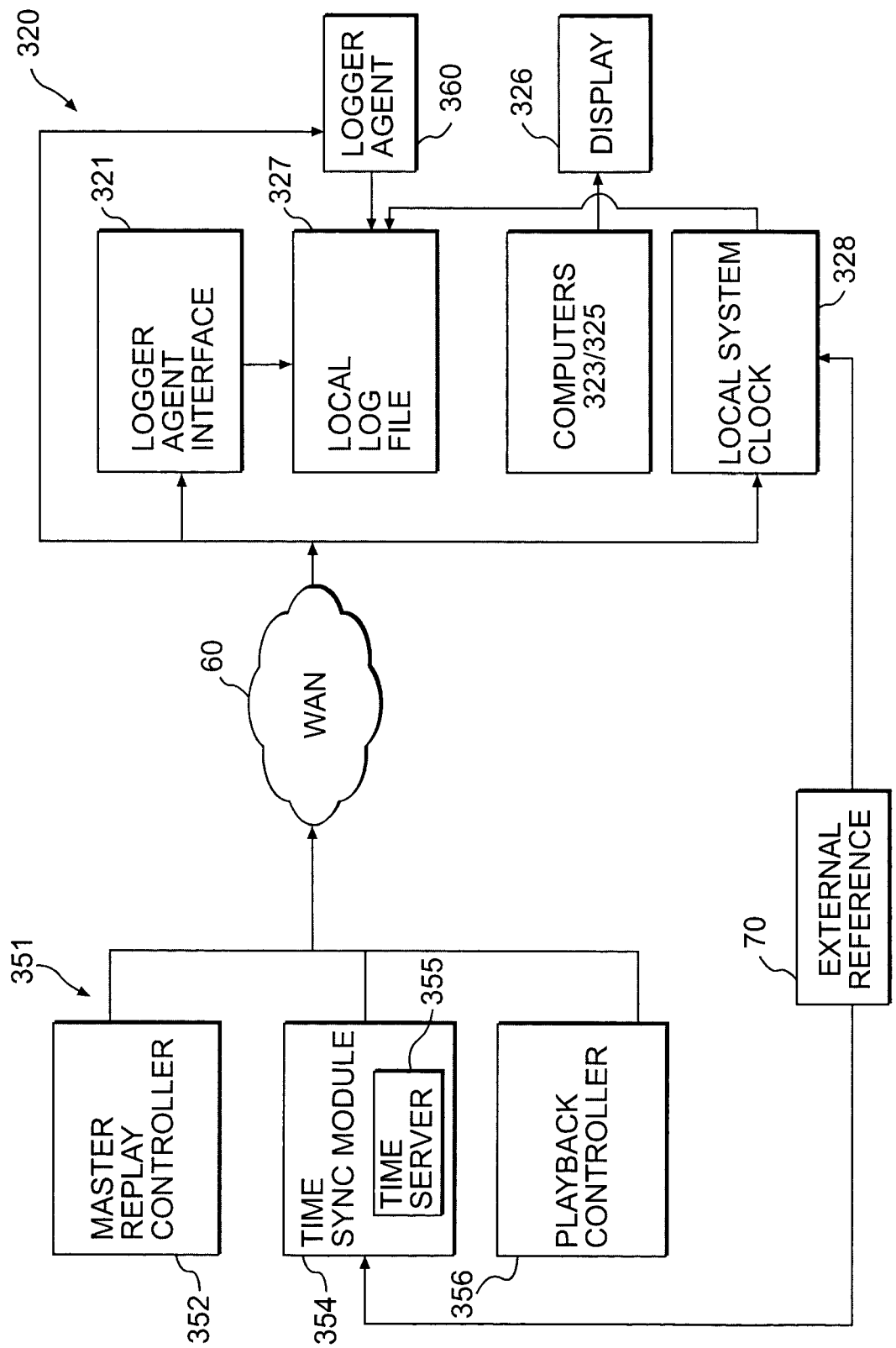
FIG. 5 illustrates specific components of the simulation architecture of FIG. 4.

FIG. 5 illustrates components of the architecture 300 that are used for synchronizing data logging and subsequent simulation data playback. As shown in FIG. 5, the monitoring and control system 351 includes master replay controller 352, time synchronization module 354, and payback controller 356. The time synchronization controller 354 optionally includes time server 355, and may receive an input from external reference 70. In an embodiment, the external reference 70 may include a geo-positioning satellite (GPS) time clock (not shown) that provides an accurate time reference to the time synchronization module 354.

Also shown in FIG. 5 are components of the individual site 320. These components include logger agent interface 321, logger agent 360, local log file 327, computers 323/325, display 326, and local system clock 328. The logger agent interface 321 receives inputs by way of the WAN 60. The local system clock 328 may receive inputs from the external reference 70.

With respect to the logger agent 360, in one embodiment, the logger interface agent 321 is provided by way of the logger agent's API. The logger agent's API provides sufficient functionality to meet the requirements for synchronized playback. In another embodiment, interfacing is accomplished by way of an agent to the DIS and HLA protocols. The thus-developed API is interfaced to the logger agent 360.

Due to bandwidth, computational and security constraints, an architecture, such as the architecture 300 shown in FIG. 4, allows independent operation of playback features at the individual MTC sites. The logger agent interface 321 is controlled by the logger agent 360 to have Start, Play, Play Fast, Pause, Go to, Loop, File, Load, and Stop features, for example.

Figure 6:
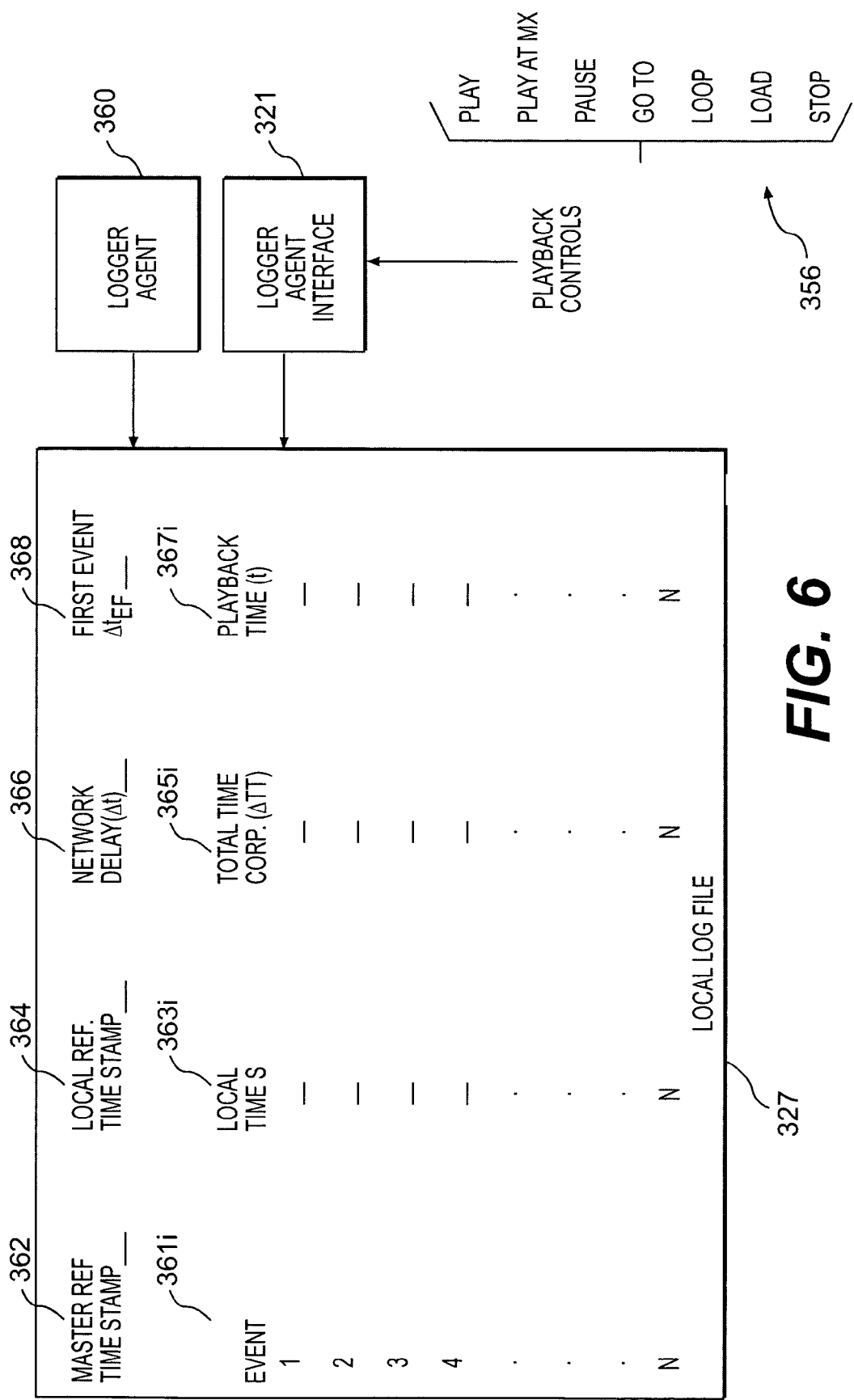
FIG. 6 illustrates local log file functions associated with the simulation architecture of FIG. 4.

In one scenario that the logger agent interface 321 accommodates, each individual site has identical log files to be replayed. This scenario is illustrated by the architecture 100 shown in FIG. 2. In this case, reference is made to a time stamp for each event in the log file 127. This time stamp is normalized to a time stamp corresponding to the first event in the log file 127, dtEvent, such that normalization of the first event results in a dtEvent of zero. The process of time stamp normalization can be performed as the log file 127 is read, and the absolute time stamp is converted into a relative value that then becomes an integral part of the synchronization process. When the first command (e.g., Play) message is received from the controller 131, a local system clock is normalized to zero, creating a relative time, dtSystem, from the receipt of the Play message. From this point forward, the process of outputting events involves reading the next event in the log file 127, calculating the relative time from Start, and when this relative time, dtEvent, equals dtSystem, the event is injected into the LAN side of the MTC sites. This process, which is described in more detail with respect to FIG. 4, is illustrated in FIG. 6.

The dtSystem relative time may be scaled to change the speed of replaying events. In addition, events may be scanned in reverse direction to replay the simulation backwards. For the command "Go to ####," the dtSystem relative time is set to a specific "go to time," and the dtSystem relative time advances without playback to the event with the dtEvent time closest to the dtSystem relative time. This method of relating event time to system time allows the accuracy of the synchronization of the playback to be as accurate as the differences in accuracy between the dtSystems of the MTC sites, assuming the commands start at the same actual time.

Referring again to FIG. 1, the sites 20 may also use an external reference (not shown in FIG. 1), such as a GPS clock to synchronize local clocks at the sites 20. That is, when the controller 31 issues a command (e.g., Play), the controller 31 also provides a time signal that states when the command should be implemented. The agents 50 located at the sites 20 receive the command and the time notation. The agents 50 also receive the local clock time of the sites 20. If the agent's GPS-referenced local time is early, the agent 50 waits to start the command. If the agent's GPS-referenced local time is late, the agent 50 immediately implements the command and attempts to "catch up." The agent 50 may "catch up" by, for example, playing the indicated event at a speed greater than 1× normal speed. In general, the controller 31 may send the time to implement a command a little ahead of the true time to make sure that the command arrives at all agents 50 before the agents 50 are supposed to implement the command.

If GPS-referenced time cannot be used, the architectures illustrated in FIGS. 1-4 can re-synchronize to compensate for network delay, if necessary, when a new command is given by having each agent 50 stop and give its location in the log file (time stamp or delta time). The controller 31 then sends a delta (change in) time for all agents 50 to start at and then continue with the new command. A delay may be added to the time each command is sent to an agent 50 to synchronize the command's arrival at each site 20. The delay may be based, for example, on the average time value of several pings to each site 20.

In another scenario that the logger agent interface 321 accommodates, the MTC sites, such as the sites 20 shown in FIG. 1, have their own unique log files. This leads to a more complex situation than that described above in that log files may have started logging at different times (e.g., a F16C MTC site may be three hours behind an AWACS MTC site). If all the sites' systems clocks are synchronized with GPS time, or by some other technique, all the time stamps are accurate, relative to each other, within the accuracy of the GPS. The controller 31 then determines the earliest time stamp of the first event, dtEvent, of each log file 27, and uses the earliest first event time stamp as a reference time stamp. The controller 31 then assigns an initial time delta (idt) to each site 20, which would be the time difference between the first event time stamp of that site's log file 27 and a reference time stamp. The procedure for replaying subsequent events would then be the same as described above for the architecture 200 where all the MTC sites use the same log file, with the initial delta time used to adjust the timing.

If GPS-referenced time is not available, the use of different log files 27 creates another complication. In addition to an earliest time stamp leading to an initial delta time (idt) as described above, a correction is required for any variations in local system clocks among the sites 20. In an embodiment, the local system clock correction is provided by a time server. The time server may operate from the master site's time system (see FIG. 5).

FIG. 6 illustrates the relationship among the local log files, the agents, and the agent interface. The elements shown in FIG. 6 conform to the architecture 300 shown in FIG. 4. However, the relationships shown in FIG. 6 also apply to the architectures shown in FIGS. 1-3.

In FIG. 6, the log file 327 for the MTC site 320 receives simulation data, or events. The logger agent 360 ensures that each event $361_i$ representing simulation actions at the site 320 is recorded in the log file 327. The logger agent interface 321 provides the functionality needed to log (and subsequently replay) the events $361_i$. The logger agent interface 321 also allows the logger agent 360 to receive commands 356 that direct replay of the events in the log file 327.

The log file 327 is unique to the site 320. That is, the events $361_i$ recorded in the log file 327 are not recorded in any other log file. Each of these events $361_i$ has associated with it two reference time stamps. A first time stamp is a master reference time stamp 362 from the time server 355. The master reference time stamp 362 is produced at the master site 350, is provided at each of the local sites, such as the local site 320, and is stored in the local site's local log file. The logger agent 360 uses the master reference time stamp 362 and a local reference time stamp 364, produced at the same time as the master reference time stamp 362, and also stored in the local log file, to correct for differences in system clocks at the master site 350 and the local site 320. For example, if the master reference time stamp 362 is 04:22:03.46 (four hours, twenty-two minutes and 3.46 seconds) and the local reference time stamp 364 is 04:22:03.05, the correction for the local site 320 is 0.41 seconds. Because all sites get the master time reference time stamp 362 from the same time server, this method corrects for variations in local computer system time among the MTC sites to provide a network time delay correction 366.

Each recorded event 361 in the log file 327 includes its own time stamp $363_i$ with the first time stamp $361_1$ set at local time system time. However, since each site 320, 330, 340 may start its first event at a different absolute time, an additional correction is used to compensate for sites joining a training session at different times (and, as a consequence, recording a different absolute time for its first event $361_1$). This second correction involves comparing time-corrected first events $361_1$ from each of the sites 320, 330, 340 to determine which is the earliest. The time of the earliest first event then is used to determine a second reference time stamp. The second time stamp is used with the network delay correction 366 to generate a total time correction $\Delta t_T$ $365_i$ to be applied to each event $361_i$. That is, the total time correction $\Delta t_T 365_i$ is the sum of the first event time differential $\Delta t_{FE}$ and the network delay correction 366.

Thus, the above-described normalization process produces two time corrections. The first time correction targets any variations in time among the system clocks among the sites. These variations are effectively zero if the simulation architecture uses GPS or some other system to synchronize the sites' computer system clocks. The second time correction targets differences in the starting time of the first event in the log file. Once time has been normalized, the process proceeds as when running the same log files at different sites (i.e., the architecture 100 shown in FIG. 2).

With these two time corrections, all the first events will be considered to be at time zero. Then, the two correction factors are subtracted from the system delta time to give a corrected system delta time (cdtSystem). For example, if MTC site 2 logs its first event 30 minutes after the first or reference site, the correction factor of 1800 seconds is subtracted from the MTC site 2 computer system delta time. Therefore, to inject the first event at MTC site 2, the system delta time would have to progress to 1800. That is, 1800 (change in system time) minus 1800 (correction factor for starting logging at different time) equals zero (the injection time of the first event for MTC site 2). With these correction factors, the system basically becomes identical to the case of each MTC site playing the same log files (i.e., the architecture 100 shown in FIG. 2).

Figure 7:
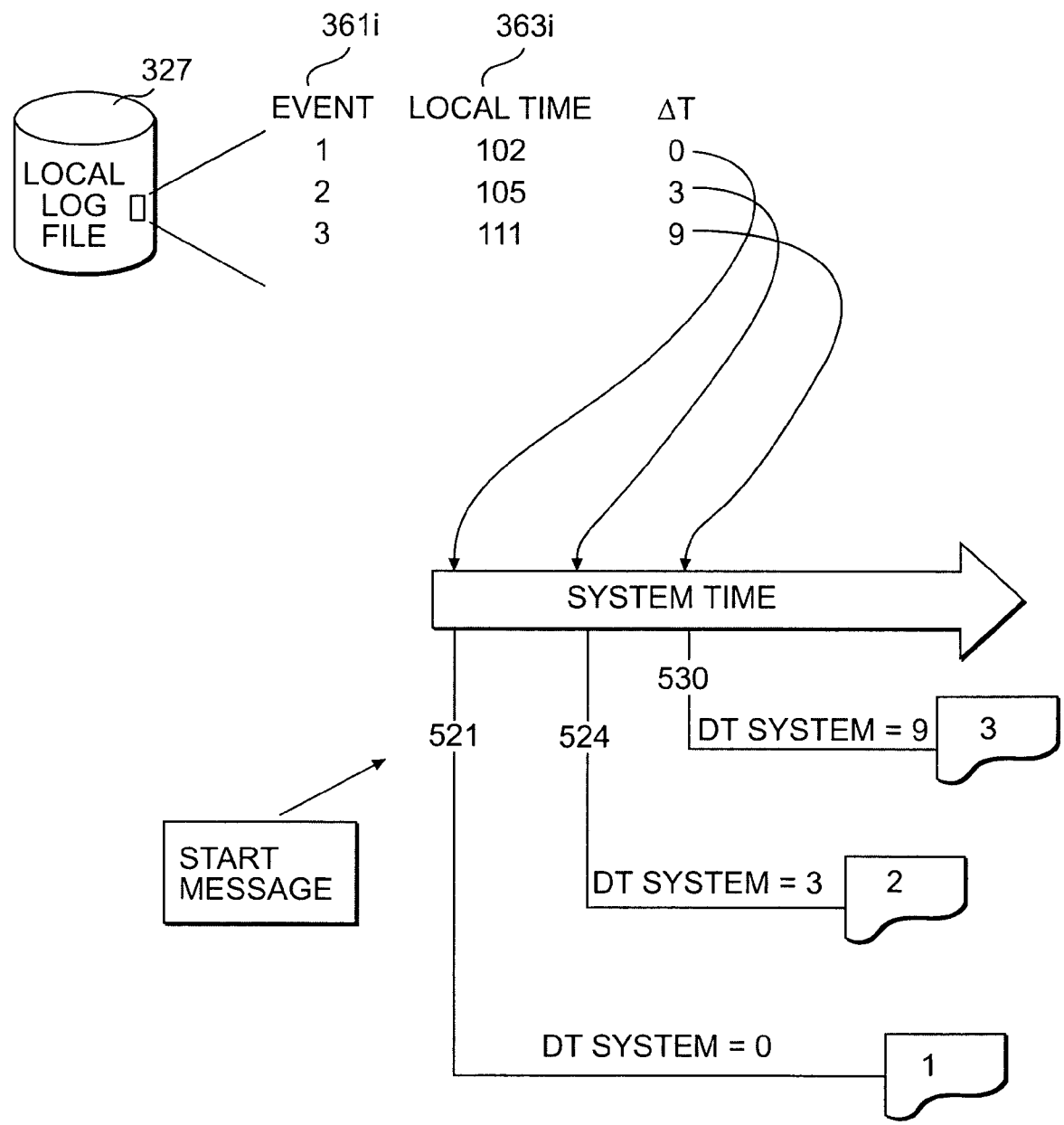
FIG. 7 illustrates time corrections associated with the simulation architecture of FIG. 4.

FIG. 7 illustrates time differentials associated with the simulation architecture of FIG. 4. In FIG. 7, the local log file 327 is shown with three events 1-3. Each of the events has an associated local time. Event 1 has a local time of 102, which is the first, or reference time. Thus, the time differential for event 1 is zero. Event 2 has a local time of 105, meaning event 2 begins three time units after the first event (event 1). Event 3 has a local time of 111, meaning the event 3 begins nine time units after the first time-stamped event.

Also shown in FIG. 7 is system time advancing from time 521, at which point a Start (or Play) command received from the controller 351 directs the commencement of simulation replay. Based on the Start command, the MTC site's test computer examines the local log file 327 and determines that event 1 is to be replayed when system time equals 521. Following display of event 1, events 2 and 3 are displayed when their associated event times equal the advancing system time. Thus, event 2 is displayed when dtSystem is 3 and event 3 is displayed when dtSystem is 9 time units.

Figure 8A:
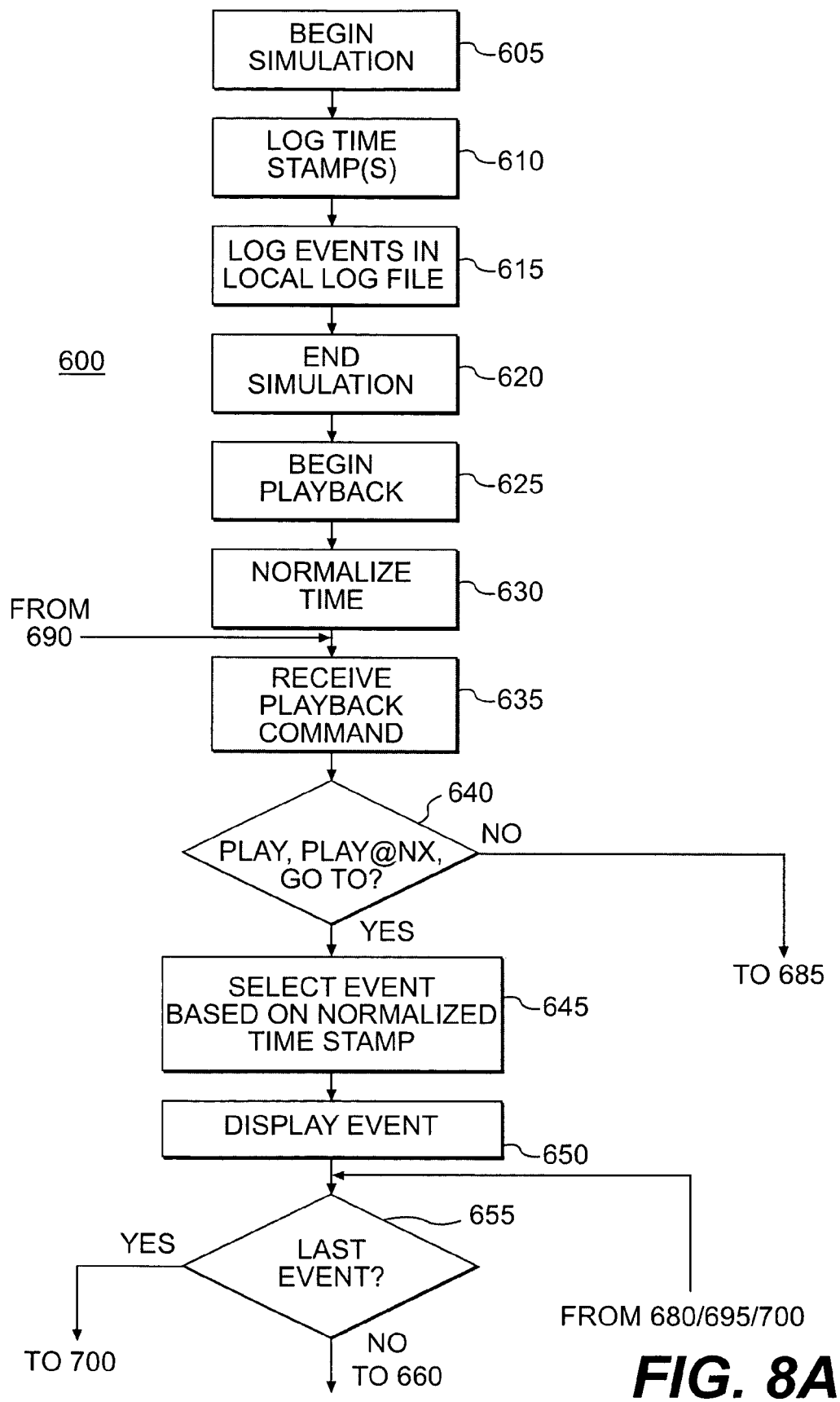
FIGS. 8A and 8B are flowcharts illustrating data recording and playback functions associated with the simulation architecture of FIG. 4.
Figure 8B:
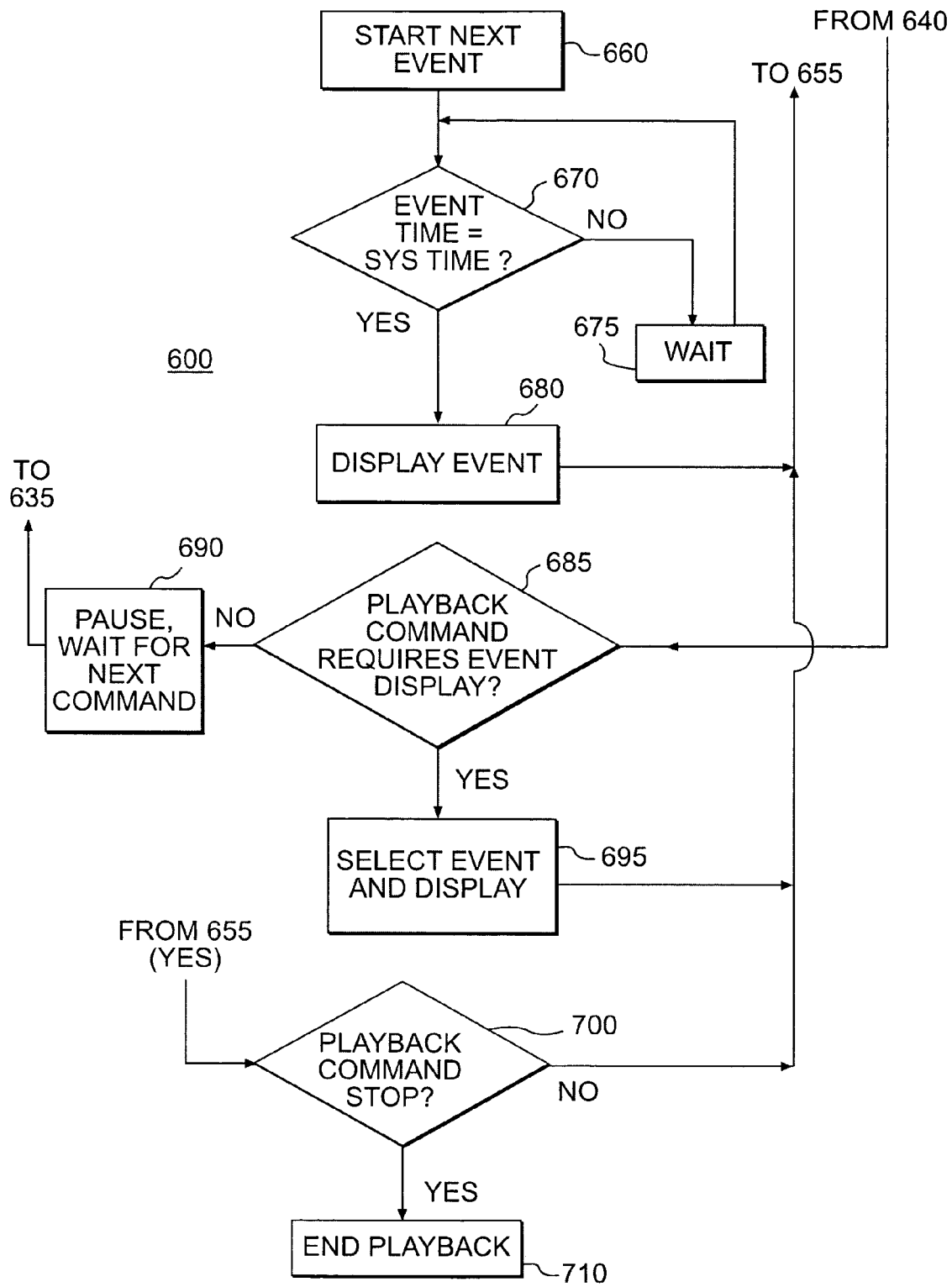

FIGS. 8A and 8B are flowcharts illustrating an operation 600 of the architecture 300 shown in FIG. 4 and the log file relationships shown in FIG. 6. In FIG. 8A, at block 605, a simulation begins involving the sites 320, 330, 340, 350. The sites 320, 330, 340, 350 may be dispersed geographically, and may exist in different time zones. The simulation may be, for example, a training exercise in which the MTC site 320 simulates a F16C air cover operation, the site 330 simulates an AWACS patrol, the MTC site 340 simulates a ground support strike by A-10 attack aircraft, and the site 350, operating as the master site, controls various aspects of the simulation, including playback of recorded events at each of the MTC sites 320, 330, 340.

In block 610, each of the test computers at the sites 320, 330, 340 logs two time stamps. The first time stamp 362 is a master reference time stamp from the master site's time server 355. The test computer's system clock produces the second time stamp 364. The second time stamp 364 represents the local system time when the time server 355 produced the master reference time stamp 362. The difference between the to time stamps 362, 364 accounts for network delay in sending signals between the master site 350 and the local site 320, for example.

The simulation continues, block 615, when the controller 351 instructs the logger agents 360 at each of the sites 320, 330, 340 to begin recording events in the site's respective local log files 327, 337, 347. The logger agents 360 then begin data recording with the first event generated by one of the site's MTC computers. Along with recording the events, the test computers ensure that time stamps $363_i$ are recorded for each event in the local log files 327, 337, 347. The event recording (block 615) continues as long as the simulation runs. In block 620 the simulation ends.

In block 625, at some time subsequent to the end of the simulation, the parties involved in the simulation decide to replay the simulation, and playback begins. A first step in executing the simulation replay is to establish reference corrections for each of the local log files 327, 337, 347. In block 630, the local time stamps $363_i$ are normalized. Normalizing the local time stamps $363_i$ begins by correcting all the first time stamps for variations or errors in time. This is accomplished by using the difference between the two reference time stamps, that is the master and local time stamps. This corrects all the local time stamps to the master time. The next step is identifying an earliest first time stamp $363_1$ among all the log files To identify the earliest first time stamp $363_i$, the control and monitoring system 351 determines the earliest time stamp of the first event from the local log files, and uses this earliest first event time stamp as a reference time stamp. The control and monitoring system 351 then assigns an initial time delta (idt) to each MTC site 320, 330, 340 that is the time difference between the first event time stamp $363_1$ of a site's local log file and the earliest first event reference time stamp. The second normalizing step corrects the local site's corrected system time referenced to the time when the play command is delivered. This second normalizing step creates a time differential dtSystem.

In block 635, each of the test computers at the sites 320, 330, 340 receives directions to begin simulation replay (playback). Playback can be signaled to the sites 320, 330, 340 by a Play command issued from the control and monitoring system 351.

In block 640, the test computers determine if the command issued from the controller is one of Play, Play at nX, or Go to XXX (where XXX represents a specific system time, dtSystem). If the command is one of these three commands (or a similar command that designates a specific event as a starting point), the operation 600 proceeds to block 645, and the test computer, using the agent 360, selects the appropriate event based on the normalized time stamps. For example, if the command is Go to 1000, the test computer will select the event from the local log file corresponding to system time (dtSystem) 1000, and will inject this event into the LAN side of the MTC site. If the command is Play, the test computer will introduce the first event in the local log file into the LAN side of the MTC site. In block 650, the selected event is displayed to human operators at the MTC site.

In block 640, if the command is not one that identifies a specific event (based, for example, on time—such as Load, Loop), then the operation 600 proceeds to block 685. In block 685, if the playback command requires an event to be displayed, the operation 600 proceeds to block 695, and the event is displayed. The operation 600 then returns to block 655. If in block 685 the command does not require the event to be displayed, the operation 600 proceeds to block 690 and waits for the next command. Upon issuance of the next command, the operation 600 returns to block 635, and the test computer receives the issued command.

In block 650, following display of the selected event, the operation 600 proceeds to block 655, and the test computer determines if the displayed event is the last event in the local log file. If the displayed event is the last event, the operation 600 proceeds to block 700. Otherwise, the operation 600 proceeds to block 660. In block 660, the test computer identifies the next event in the local log file. In block 670, the test computer determines if the event time, dtEvent, for the next event equals system time, dtSystem. If the times are not equal, the operation 600 proceeds to block 675 and waits for a specified time, at which point the operation 600 returns to block 670. If the times are equal, the operation 600 proceeds to block 680, and the next event is displayed on the LAN side of the MTC site. The operation 600 then returns to block 655.

In block 700, after the last event is displayed, the test computer determines if a Stop command has been issued. If the Stop command has not issued, the operation 600 returns to block 655. If the Stop command is received, the operation 600 ends, block 710.

We claim:

1. A method for time synchronizing playback of dissimilar data files, comprising:
    logging a first data set at a first local site, wherein logging includes recording a time of each event in the first data set;
    logging a second data set at a second local site, wherein logging includes recording a time of each event in the second data set;
    logging a nth data set at a nth local site, wherein logging includes recording a time of each event in the nth data set, and wherein the first data set, second data set and nth data set relate to a simulation;
    establishing a first master time stamp at a master site and a corresponding first local time stamp at the first local site, the first master time stamp related to a computer system clock at the master site and to a computer system clock at the first local site, wherein the first master time stamp of the master site corresponds to a time when the first local time stamp of the first local site was established;
    establishing a second master time stamp at the master site and a corresponding second local time stamp at the second local site, the second master time stamp related to the computer system clock at the master site and to a computer system clock at the second local site, wherein the second master time stamp of the master site corresponds to a time when the second local time stamp of the second local site was established;
    establishing a nth master time stamp at the master site and a corresponding nth local time stamp at the nth local site, the nth master time stamp related to the computer system clock at the master site and to a computer system clock at the nth site, wherein the nth master time stamp of the master site corresponds to a time when the nth local time stamp of the nth local site was produced;
    recording the first, the second and the nth master and local time stamps;
    issuing a play command to commence a replay of the simulation; correcting for differences and errors in among all the local site's computer system clocks, wherein corrections are produced by comparison of a master time stamp and a local site's local time stamp, wherein the correction is used to correct that local site's system time;
    normalizing the local site's corrected system time referenced to the time when the play command is issued, wherein the normalization creates a time differential dtSystem;
    normalizing the recorded time of each event in the data sets relative to a time of a first event in the data set, wherein the normalization creates time differentials, dtEvent;
    normalizing for differences in logging start times among all local sites, wherein all local sites corrected logging start times are compared to determine the first local site to start logging;
    comparing when all other local sites started logging and determining a correction to each local site's dtEvent based on the logging start time differences;
    advancing dtSystem as play time advances;
    pausing dtSystem when play is paused; and
    injecting logged event data, wherein the logged event data are injected when dtEvent equals dtSystem.

2. The method of claim 1, further comprising scaling dtSystem to change the speed of replaying the simulation.

3. The method of claim 1, wherein events are scanned in reverse order to replay the simulation backwards.

4. The method of claim 1, wherein the master site commands the first, second, and nth local sites to go to a specific dtSystem, wherein event data with a dtEvent equal to the specific dtSystem is injected into the simulation architecture.

5. The method of claim 1, wherein the local computer clock times are provided by a geo-positioning satellite clock.

6. The method of claim 1, further comprising correcting for variations in the local computer clock times between the first, second, and nth local sites.

7. The method of claim 6, wherein the master site comprises a time server, and wherein the time server provides the corrections for variations in the local computer clock times.

8. A system that provides time synchronized playback and control of dissimilar data in a simulation architecture, comprising:
    a master site, comprising:
        a controller, and
        agents, implemented by the controller, wherein the controller directs the agents to control simulation data logging and playback;
    simulation sites, comprising:
        one or more simulation computers, wherein simulation events occur, a computer, wherein the agents control the simulation site to record the simulation data, and
        a local log that stores the simulation data as events, wherein the agents control the test computer to replay the events; and
    a time reference system comprising:
        a master site time stamp for each of the simulation sites,
        a local time stamp for each of the simulation sites, each local time stamp related to the master site time stamp, and
        one or more time normalization factors, wherein the time normalization factors relate times recorded for each of the events to an earliest recorded event and to a time of initiation of a replay command, wherein a corrected event time, dtEvent, and a corrected system time, dtSystem, are established, and wherein events are injected for replay into the simulation architecture when the dtEvent and the dtSystem are equal.

9. The system of claim 8, further comprising means for scaling dtSystem to change the speed of replaying the simulation.

10. The system of claim 8, wherein events are scanned in reverse order to replay the simulation backwards.

11. The system of claim 8, further comprising means for commanding the simulation sites to go to a specific dtSystem, wherein event data with a dtEvent equal to the specific dtSystem is injected into the simulation architecture.

12. The system of claim 8, wherein the master site and the simulation sites receive local computer clock times provided by a geo-positioning satellite clock.

13. The system of claim 12, further comprising means for correcting for variations in the local computer clock times among the simulation sites.

14. The system of claim 13, wherein the master site further comprises a time server, and wherein the time server provides the corrections for variations in the local computer clock times.

15. The system of claim 8, wherein the master time stamps and each corresponding local time stamps are related by a network delay, the network delay comprising a one-way time required to transfer signals between the master site and a local site.

16. A system for synchronizing time-related data recorded at a plurality of nodes in a network, comprising: means for establishing a master node and one or more local nodes from the plurality of nodes;

means for establishing master time stamps at the master node;

means for providing a master time stamp to each of the local nodes;

means for establishing local time stamps at each of the local nodes, wherein the local time stamps are related to a master time stamp; means for commencing data recording at one or more of the local nodes;

means for recording a local time the data is recorded, whereby the time-referenced data are established; and means for normalizing the recorded times among the local sites and the master site.

17. The system of claim 16, wherein the means for normalizing the recorded times, comprises: means for determining an earliest recorded data entry among the local sites; and means for establishing a time correction for each of the subsequently recorded data entries relative to the earliest recorded data entry.

18. The system of claim 16, further means for comprising correcting for variations in local clock times among the local sites.

19. The system of claim 18, wherein the master site comprises a time server, and wherein the time server provides the corrections for variations in the local clock times.

* * * * *